(12) United States Patent
Sola et al.

(10) Patent No.: US 10,737,777 B2
(45) Date of Patent: Aug. 11, 2020

(54) GEARBOX CASING, A GEARBOX, AND AN AIRCRAFT

(71) Applicant: AIRBUS HELICOPTERS, Marignane (FR)

(72) Inventors: Cyril Sola, Pelisanne (FR); Thierry Rey, Aix en Provence (FR); Jean-Victor Lapeyre, Lancon-de-Provence (FR); Philippe Moniot, Bergogne (FR); Laurent Bourdier, Issoire (FR)

(73) Assignee: AIRBUS HELICOPTERS, Marignane (FR)

( * ) Notice: Subject to any disclaimer, the term of this patent is extended or adjusted under 35 U.S.C. 154(b) by 308 days.

(21) Appl. No.: 15/831,812

(22) Filed: Dec. 5, 2017

(65) Prior Publication Data
US 2018/0178909 A1   Jun. 28, 2018

(30) Foreign Application Priority Data

Dec. 22, 2016 (FR) .................................... 16 01841

(51) Int. Cl.
*B64C 27/82* (2006.01)
*B64C 27/12* (2006.01)
*B64C 27/16* (2006.01)
*B64C 27/28* (2006.01)

(52) U.S. Cl.
CPC .............. *B64C 27/82* (2013.01); *B64C 27/12* (2013.01); *B64C 27/16* (2013.01); *B64C 27/28* (2013.01); *B64C 2027/8236* (2013.01)

(58) Field of Classification Search
CPC ......... B64C 27/82; B64C 27/12; B64C 27/16; B64C 27/28; B64C 2027/8236
See application file for complete search history.

(56) References Cited

U.S. PATENT DOCUMENTS

| 3,000,445 | A | * | 9/1961 | Stuart, III | ............... B64C 27/82 416/42 |
| 3,502,290 | A |   | 3/1970 | Legrand et al. | |
| 3,875,823 | A |   | 4/1975 | Velasquez | |
| 6,164,915 | A |   | 12/2000 | Certain | |
| 9,145,834 | B2 | * | 9/2015 | Frost | ......................... F02C 7/32 |

(Continued)

FOREIGN PATENT DOCUMENTS

FR        2777861 A1        10/1999

OTHER PUBLICATIONS

French Search Report for French Application No. FR 1601841, Completed by the French Patent Office, dated Sep. 11, 2017, 6 pages.

*Primary Examiner* — Vicky A Johnson
(74) *Attorney, Agent, or Firm* — Brooks Kushman P.C.

(57) ABSTRACT

An upper casing with a hollow shell made of composite materials. The shell was a side wall that extends in elevation from a housing flange to a housing collar, the side wall including at least one cutout. The upper casing includes an internal liner that is inserted inside the shell and that is fastened to an inside face of the shell, the liner comprising a base and a top, together with at least two legs extending in elevation from the base to the top, the liner further comprising at least one equipment support in register with a cutout, each equipment support being for carrying a removable piece of equipment of the upper casing.

20 Claims, 4 Drawing Sheets

(56) References Cited

U.S. PATENT DOCUMENTS

| | | | |
|---|---|---|---|
| 2015/0125299 A1* | 5/2015 | Baskin | B64C 27/10 |
| | | | 416/128 |
| 2015/0166175 A1* | 6/2015 | Prud'Homme-Lacroix | ................ |
| | | | B64C 27/52 |
| | | | 244/17.21 |
| 2017/0211682 A1* | 7/2017 | Ronk | F16H 57/032 |
| 2018/0178909 A1* | 6/2018 | Sola | B64C 27/28 |

\* cited by examiner

GEARBOX CASING, A GEARBOX, AND AN AIRCRAFT

CROSS-REFERENCE TO RELATED APPLICATIONS

This application claims priority to French patent application No. FR 1601841 filed on Dec. 22, 2016, the disclosure of which is incorporated in its entirety by reference herein.

BACKGROUND OF THE INVENTION

(1) Field of the Invention

The present invention relates to a casing for a gearbox, to a gearbox, and to an aircraft provided therewith.

2) Description of Related Art

An aircraft may include a main power transmission gearbox that is interposed between a power plant and propulsion means. For example, a helicopter may include a gearbox that is interposed mechanically between at least one engine and a rotor, the rotor contributing at least in part to providing the helicopter with lift, and possibly also with propulsion.

A gearbox has rotary mechanical members. For example, a gearbox includes at least one rotary speed reduction stage that is to reduce the speed of rotation of a rotating shaft. This rotary speed reduction stage may be in the form of an epicyclic gear train. By way of example, a planet carrier in the rotary speed reduction stage may then be secured to a rotor mast that drives the rotor in rotation. The rotor mast may have one or more shafts.

The rotary mechanical members are housed within an outer housing. This outer housing of a gearbox may comprise a plurality of elements referred to below as "casings". For example, the housing may comprise in succession and in elevation: a lower casing forming the bottom of the gearbox, followed by an upper casing, and a casing referred to as the "lift casing".

The rotary speed reduction stages and the inlet gearing of the gearbox may then be housed in the lower casing. Under such circumstances, the term "gearbox" sometimes refers only to this subassembly.

The upper casing and the lift casing have the rotor mast passing through them.

The lift casing may be provided with bearing means that surround the rotor mast in order to guide it. In addition, the lift casing may have fastener means for carrying suspension bars.

In this context, the upper casing, which may optionally be conical in shape, serves to connect the lift casing mechanically to the lower casing. Furthermore, the upper casing is bolted to the lift casing and to the lower casing in order to enable forces and moments to be transmitted from the lift casing to the lower casing.

The upper casing is complex in shape in order to carry various pieces of equipment. For example, the upper casing may have projections for carrying pipework, magnetic plugs, sensors that are to measure the speed of rotation of the rotor mast, . . . .

Because of the various pieces of equipment carried by the upper casing, and because of the forces and moments it needs to transmit, the upper casing is usually made out of metal, and by way of example out of titanium or aluminum alloy, as are the lift casing and the lower casing. Consequently, the outer housing of the gearbox, and in particular the upper casing, can present weight that is not negligible.

Documents U.S. Pat. Nos. 3,875,823, 3,502,290, and FR 2 777 861 are also known.

BRIEF SUMMARY OF THE INVENTION

The present invention thus seeks to propose a novel upper casing tending to present reduced weight.

The invention thus provides an upper casing for fastening to a lower casing and to a lift casing of a gearbox.

The upper casing comprises:

a hollow shell made of composite materials, the shell presenting a side wall extending in elevation from an open housing flange towards an open housing collar, the side wall defining transversely a hollow inside space of the shell that extends along an extension axis and that opens out to an outside medium situated outside the shell via a bottom opening of the housing flange and via a top opening of the housing collar, the side wall including at least one cutout, the housing collar being for fastening to the lift casing, and the housing flange being for fastening to the lower casing; and an internal liner that is inserted inside the hollow shell and that is fastened to the hollow shell, the liner comprising a base in the form of a ring describing a closed line and a top in the form of a ring describing another closed line, at least two legs extending in elevation from the base to the top, the liner having at least one equipment support in register with the at least one cutout, each equipment support being designed to carry a removable piece of equipment of the upper casing.

The term "open housing flange" refers to a solid occupying the perimeter of the bottom opening. By way of example, the housing flange is in the form of a ring, possibly non-circular, lying radially between an outside line and an inside line, the inside line describing the periphery of the bottom opening.

Likewise, the term "housing collar" refers to a solid occupying the periphery of the top opening. By way of example, the housing collar is in the form of an optionally non-circular ring lying radially between an outside line and an inside line, the inside line describing the periphery of the top opening.

The term "equipment support" designates a support enabling a piece of equipment to be carried, such as for example a pipe, a magnetic plug, or a rotary speed sensor.

In this context, some of the prior art describes an upper casing comprising a single piece of metal. Fabricating an upper casing out of composite materials would appear to be difficult to achieve, if not impossible industrially speaking, because of the complex shape that results from the presence of the equipment supports.

The invention proposes an upper casing that is not a single piece but that is made up of at least two distinct parts that are fastened together.

Thus, the upper casing has a shell. This shell is provided from bottom to top with a housing flange, a side wall, e.g. in the form of a truncated cone, and the housing collar. By way of example, the housing flange, the side wall, and the housing collar may form a single mechanical part, e.g. obtained by molding.

Furthermore, the upper casing includes a liner provided with conventional equipment supports.

The shell is thus a structural part serving in particular to transmit forces and moments. In contrast, the shell is not provided with the usual equipment supports. Under such circumstances, the shell may have a geometrical shape that is relatively simple, enabling it to be fabricated out of composite materials.

In addition, the liner has the function of enabling pieces of equipment to be installed, e.g. at least one pipe and/or at least one magnetic plug and/or at least one sensor for measuring a speed of rotation of a rotor mast. Under such circumstances, the liner need not necessarily withstand large forces and moments, and can thus be structurally relatively simple.

Thus, the liner makes it possible to simplify the shape of the shell, thereby enabling the shell to be made out of composite materials. Under such circumstances, the invention makes it possible to obtain an upper casing that is made at least in part out of composite materials.

The combination of the shell and the liner can thus make it possible to obtain an upper casing that presents the required levels of performance in terms of conveying forces and moments, while presenting reduced weight.

The upper casing may also include one or more of the following characteristics.

For example, the shell may include a multidirectional braid together with a plurality of local unidirectional reinforcing plies, each reinforcing ply comprising preimpregnated fibers extending in elevation.

By way of example, the preimpregnated fibers extend at least in register with a servo-control of a rotor. The preimpregnated fibers serve in particular to direct forces.

A braid is a textile article obtained by weaving fibers, e.g. carbon fibers. In a braid, the fibers are regularly interlinked and they follow a particular path.

A multidirectional braid comprises fibers that extend along paths that are not parallel. For example, a two-directional braid comprises fibers extending in two directions, e.g. sloping respectively at plus 45 degrees and at minus 45 degrees relative to a middle direction. The braid may be a standard 19 inch sheath.

The braid is thus obtained from composite materials, and it may be conical in shape.

Furthermore, the preimpregnated fibers of the reinforcing plies may be of the type known under the name G947 M18, for example. The fibers of the reinforcing plies are thus obtained from composite materials. The reinforcing plies may be arranged locally or over the entire braid.

A resin, e.g. a resin of the type known under the name RTM6, may also be used for preimpregnating the fibers.

The reinforcing fibers and/or the braid may be parts at least of the side wall, and possibly also of the housing flange and/or of the housing collar.

In another aspect, the housing flange may include at least locally metal or composite reinforcement arranged between preimpregnated fiber plies, the reinforcement including passages in register with cells in said fiber plies, the passages and said cells being for passing screw-fastener means.

By way of example, the screw-fastener means comprise bolts, pins, or the equivalent.

Each piece of reinforcement constitutes a mechanical part enabling the shell to be reinforced locally. The reinforcement may comprise a trellis so as to present low weight.

Furthermore, each piece of reinforcement locally splits the skin of the shell into two groups, thereby tending to limit any risk of materials becoming delaminated in a zone that is subjected to high forces and moments.

Each of these two groups may include fiber plies, e.g. carbon fiber plies. Optionally, at least one group may include interface plies of glass fibers. These glass fiber plies tend to limit any risk of galvanic corrosion in contact with another casing made of metal.

The shell may be fabricated by molding, and in particular by using the resin transfer molding (RTM) method. The various elements of the shell are thus positioned between a mold and a countermold, with resin then being injected in this method into the gap between the mold and the countermold.

In another aspect, the liner may be made out of a material from the group of metal or thermosetting materials.

By way of example, the liner may be made from a material known under the name ULTEM.

The liner may be fabricated by fast prototyping.

In another aspect, the housing collar may extend in elevation from a plane bottom bearing face to a plane top bearing face that is for arranging against said lift casing, and said upper casing may include an insert of ring shape arranged in elevation between the housing collar and the top of the liner, the insert being placed against the bottom bearing face, the insert having tapped holes, each tapped hole being in alignment with a through orifice in the housing collar.

The term "through" means that each orifice opens out in the bottom bearing face and in the top bearing face.

By way of example, such an insert is made of metal. The insert may comprise nut plates or the equivalent, in order to form the tapped holes, for example. The insert seeks to improve fastening of the shell to a lift casing.

In another aspect, the housing collar may extend from the side wall towards the extension axis, the housing flange extending from the side wall away from the extension axis.

In another aspect, the liner may include one of the at least one equipment support in register with each cutout of said shell.

In another aspect, the top may include a drip collector, said drip collector having a section, e.g. of U-shape, that is open towards the housing collar, at least two legs being secured to the drip collector.

Such a drip collector may be arranged at the level of and around a member of a rotor mast that tends to project lubrication liquid outwards by centrifuging. The drip collector serves to collect a lubrication liquid in order to monitor the liquid, e.g. by using a magnetic plug.

In another aspect, at least one leg may include a duct forming pipework integrated in the liner.

In another aspect, the liner may include at least one top pipe extending from a bottom of said drip collector to one of the at least one equipment support, this equipment support presenting a cavity opened on the top pipe, this equipment support presenting a channel opening out to said cavity and to said outside medium via one of the at least one cutout, a removable magnetic plug shutting said channel, the liner including a bottom pipe going from said cavity to said housing flange.

The term "shutting" means that the magnetic plug tends to prevent hydraulic liquid leaking to the outside medium.

In another aspect, the housing flange may include a groove suitable for receiving a sealing gasket.

The liner may be provided with a sealing gasket. The shell is made easier to fabricate when the groove is present in the liner.

In another aspect, at least one equipment support may be carried by at least one reinforcing leg.

In another aspect, at least one equipment support may be carried by at least the base or the top of the liner.

In another aspect, the liner may be adhesively bonded to said shell.

The invention also provides a gearbox comprising an outer housing, the outer housing comprising a lower casing fastened to an upper casing and a lift casing fastened to the upper casing. The upper casing is a casing of the invention as described above.

The gearbox may include and drive a rotor mast, and at least one sensor for measuring a speed of rotation of the rotor mast may be fastened to an equipment support.

Likewise, at least one magnetic plug may be fitted to the casing.

The invention also provides an aircraft having a gearbox of the invention.

BRIEF DESCRIPTION OF THE DRAWINGS

The invention and its advantages appear in greater detail from the context of the following description with examples given by way of illustration and with reference to the accompanying figures, in which.

DETAILED DESCRIPTION OF THE INVENTION

Elements present in more than one of the figures are given the same references in each of them.

Figure 1:
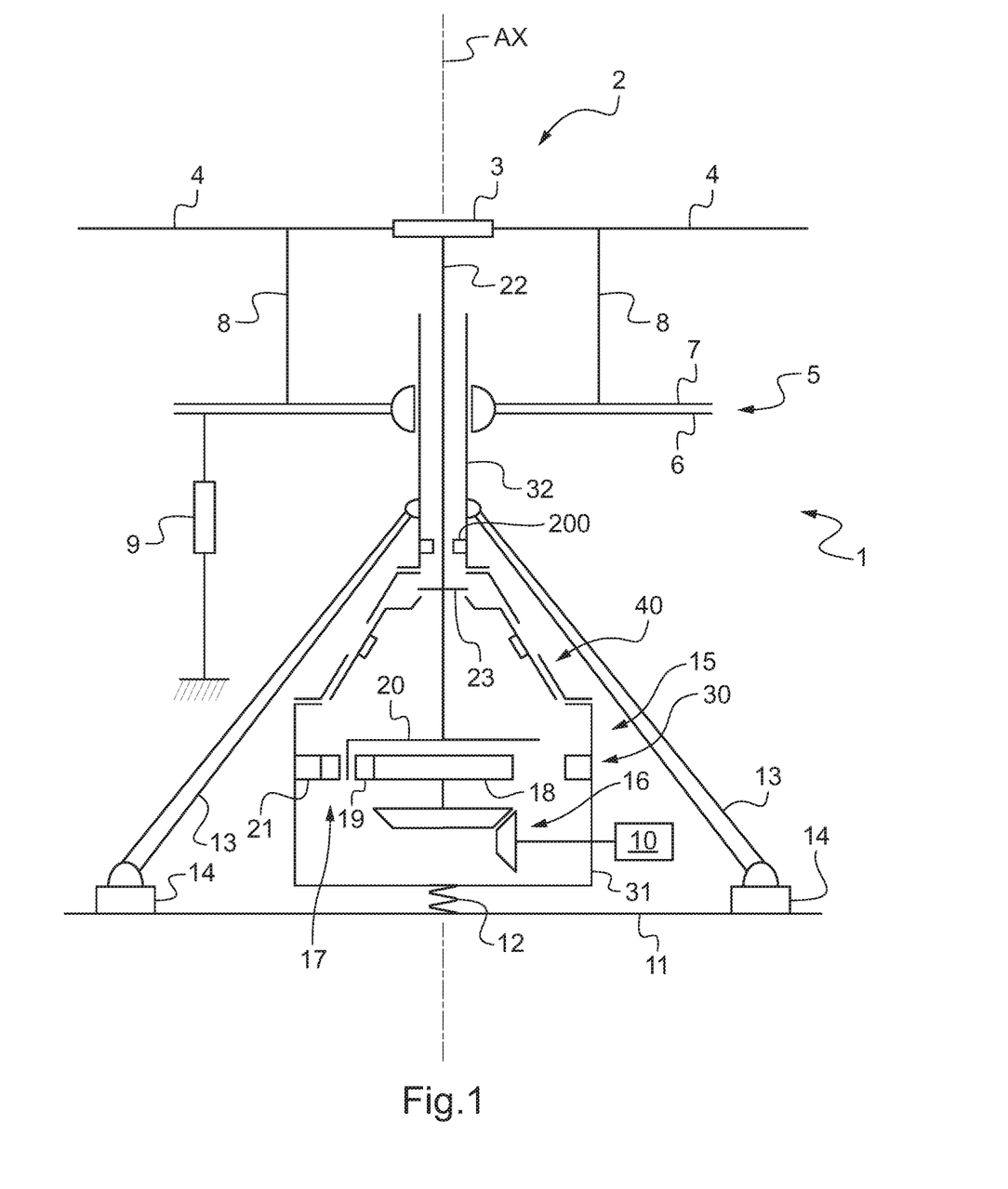
FIG. 1 is a diagram showing a gearbox of the invention.

FIG. 1 shows an upper casing 40 of the invention. This upper casing 40 may for example be arranged on a gearbox 15 of an aircraft 1.

By way of example, the aircraft 1 has a rotor 2. The rotor 2 may contribute at least in part to providing the aircraft 1 with lift and/or propulsion. The rotor 2 has a plurality of blades 4. The blades 4 are carried by a rotor head 3, optionally such as a hub.

In another aspect, the pitch of the blades can be controlled by means of at least one servo-control 9. For example, at least three servo-controls 9 are individually hinged to a non-rotary plate 6 of a swashplate assembly 5. A rotary plate 7 of the swashplate assembly 5 is then connected to each of the blades via at least one rod 8.

In order to rotate the blades 4 about an axis of rotation of the rotor 2, the aircraft may have at least one engine 10. The engine 10 drives the gearbox 15, the gearbox 15 including a rotor mast 22 constrained to rotate with the rotor 2.

The gearbox has a plurality of rotary members that are interposed between the engine 10 and the rotor mast. These rotary members may include a rotary speed reduction stage 17. For example, an inlet gear 16 is connected to at least one engine 10 via a drive train. The inlet gear 16 may for example be connected by a shaft to a sungear 18 of a rotary speed reduction stage 17. The sungear 18 meshes with at least one planet gear 19 that runs along a toothed ring 21 of the rotary speed reduction stage 17. The planet gears 19 are carried by a planet carrier 20 that is secured to the rotor mast 22.

The rotary members are arranged within an outer housing 30. This outer housing 30 comprises a lower casing 31 surrounding in particular the inlet gear 16 and the rotary speed reduction stage 17. A conventional suspension system 12 may extend between the lower casing 31 and a support platform 11.

The lower casing 31 is fastened to an upper casing 40 of the invention. This upper casing 40 is then fastened to a lift casing 32.

The lift casing 32 may carry at least one ball or roller bearing system 200 guiding the rotor mast. Such a ball or roller bearing system 200 is lubricated by conventional lubrication system. The lubrication liquid can flow along the rotor mast and reach spray means 23 tending to move the lubrication liquid centrifugally towards the upper casing. The spray means 23 may be in the form of a shoulder of the rotor mast, for example.

Furthermore, the lift casing may be hinged to suspension bars 13. Each suspension bar 13 may also be hinged to a suspension device 14 which is fastened to the platform 11.

Figure 2:
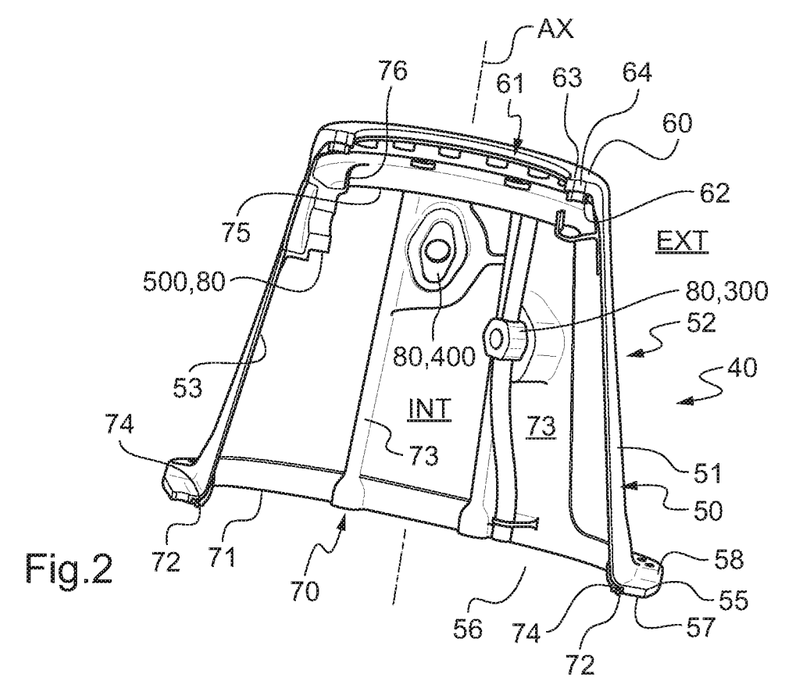
FIG. 2 is a diagram showing an upper casing of the gearbox.

FIG. 2 shows an upper casing 40 of the invention.

Figure 3:
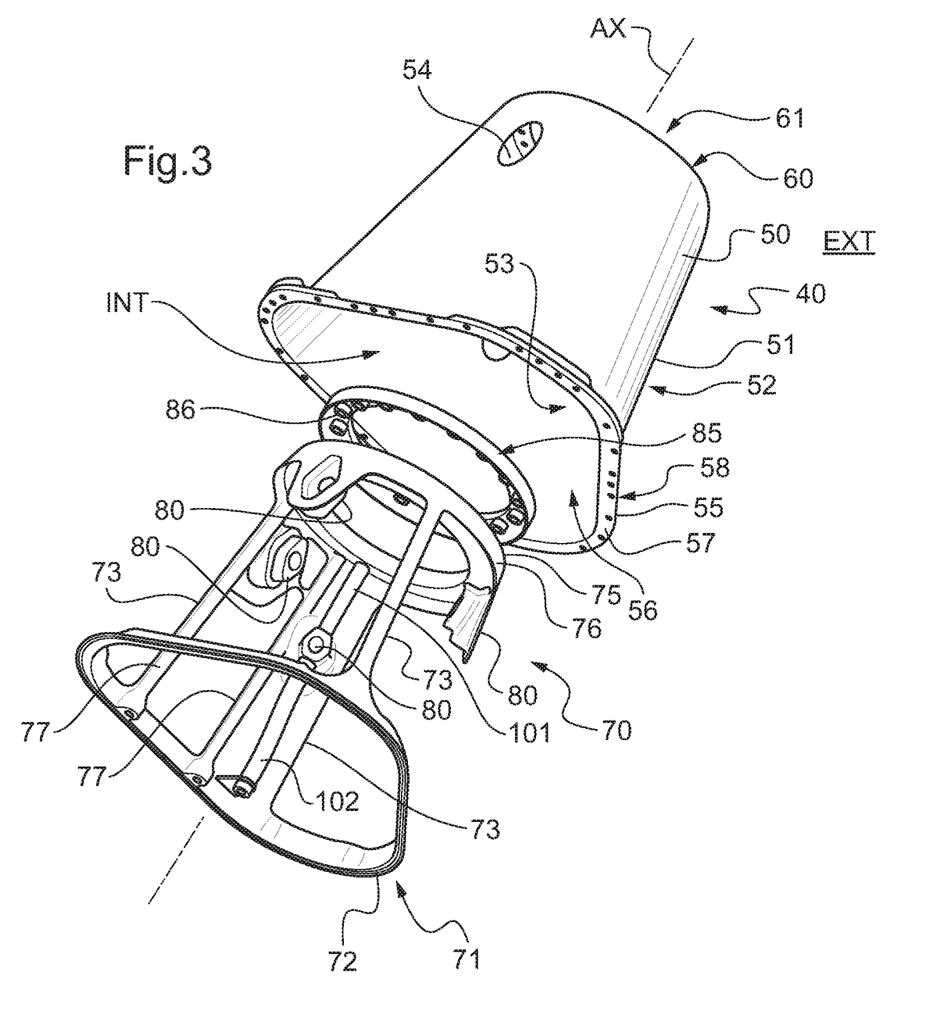
FIG. 3 is an exploded view of the upper casing.

FIG. 3 is an exploded view of the upper casing 40.

The upper casing 40 comprises a shell 50. This shell 50 is hollow and can be substantially conical in shape, possibly of non-circular section.

Specifically, the shell 50 presents a side wall 51 extending upwards along an extension axis AX from a housing flange 55 to a housing collar 60. By way of example, the extension axis AX coincides in operation with the axis of rotation of the rotor.

The side wall 51 describes a closed surface that defines transversely an internal space INT. Under such circumstances, the side wall 51 extends transversely in a thickness direction from an inside face 53 facing the inside space to an outside face 52 facing the outside medium EXT situated outside the shell 50.

The term "transversely" refers to any direction perpendicular to the extension axis AX.

The inside space INT opens out to the outside medium EXT via a bottom opening 56 in the housing flange 55 and a top opening 61 in the housing collar 60.

For this purpose, the housing flange 55 forms the perimeter of the bottom opening 56. The housing flange 55 thus presents a wall that extends transversely from the side wall, e.g. away from the extension axis AX. The housing flange 55 extends in thickness and in elevation from a bottom face 57 for docking against the lower casing to a top face 58. Fastener holes may pass through this thickness of the housing flange 55, e.g. in order to enable the upper casing 40 to be bolted to the lower casing 31.

Likewise, the housing collar 60 forms the perimeter of the top opening 61. The housing collar 60 thus presents a wall that extends transversely from the side wall, e.g. towards the extension axis AX. The housing collar 60 extends in thickness and in elevation from a plane bottom bearing face 62 to a plane top bearing face 63 for docking against the lift casing 32. Fastener holes may pass through this thickness of the housing collar 60, e.g. in order to enable the upper casing 40 to be bolted to the lift casing 32.

Furthermore, the side wall 51 includes at least one cutout 54. Such a cutout 54 enables removable pieces of equipment to be installed.

Consequently, the shell 50 is of relatively simple shape so that it is suitable for being fabricated out of composite materials, possibly by using the RTM method of fabrication.

Figure 4:
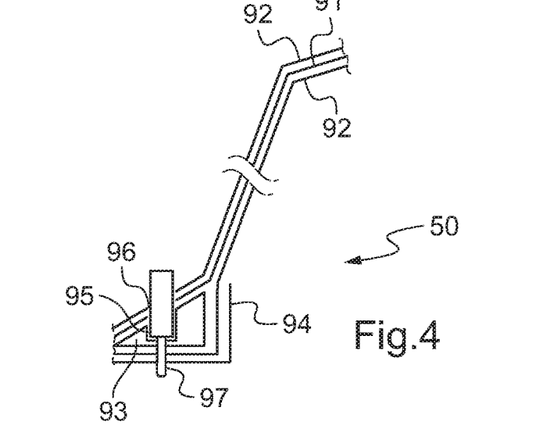
FIG. 4 is a diagrammatic section of a shell.

FIG. 4 is a diagram showing various materials that may make up the shell. These various materials are in particular bonded together by resin that is not shown. The arrangement shown is given for illustrative purposes.

Thus, the shell 50 may comprise a multidirectional braid 91 in the side wall and possibly also in the housing flange and/or the housing collar.

Furthermore, the shell 50 may include a plurality of unidirectional reinforcing plies 92. By way of example, each reinforcing ply 92 comprises pre-impregnated fibers, e.g. carbon fibers. These fibers may extend in elevation, and where appropriate in register with a respective servo-control. The reinforcing plies 92 may be positioned on the side wall, and possibly also on the housing flange and/or the housing collar.

Furthermore, the shell 50 may include at least one piece of reinforcement embedded in the housing flange 55. Thus, the housing flange 55 may include, at least locally, reinforcement 93 that may be made of metal or of composite material. Such reinforcement 93 is arranged between the fiber plies, these fiber plies possibly comprising interface plies 94 of glass fiber. The reinforcement 93 includes passages 95 facing cells 96 in the fiber plies for the purpose of constituting holes that co-operate with screw-fastener means 97. Thus, a bolt may pass through the housing flange 55, for example.

Furthermore, and with reference to FIG. 2, the upper casing includes internal liner 70.

The liner 70 is a part that is distinct from the shell 50 and that is inserted inside the shell 50. Furthermore, the liner 70 may be fastened to the shell by various means, e.g. involving adhesive bonding, screw-fastening, riveting, . . . . For example, the liner 70 may be at least adhesively bonded to the shell. More precisely, the liner 70 may be fastened to at least the inside face 53 of the side wall.

The liner 70 may comprise in succession and in elevation a base 71, at least two legs 73, and a top 75.

The base 71 may match the shape of the housing flange 55. In addition, the base 71 may be in the form of a ring, which should be understood broadly, since it is not necessarily circular. Thus, the base 71 extends around a closed line to represent the periphery of a bottom opening 56, this bottom opening representing an interface section between the inside space INT and the outside medium EXT. The bottom opening is to open out to the lower casing.

Optionally, the base 71 includes a groove 72 that is open to the outside medium. The groove 72 is to face the bottom casing. The groove is dimensioned to receive a sealing gasket 74. The base 71 may be clamped between the housing flange and the lower casing.

The top 75 may also be in the form of a ring, which should be understood broadly, since it is not necessarily circular. Thus, the top 75 extends around a closed line in order to represent the periphery of a top opening 61, this top opening 61 representing an interface section between the inside space INT and the outside medium EXT. The top opening is to open out to the lift casing. The top 75 may be pressed directly against the housing collar, or it may be pressed against an insert that is itself pressed against the housing collar.

The base 71 and the top 75 are connected together by at least two legs 73. Each leg 73 thus extends in elevation parallel to the inside face, and possibly against the inside face, from the base 71 to the top 75.

Furthermore, the liner 70 includes at least one equipment support 80 facing a cutout 54.

By way of example, the liner 70 has at least as many equipment supports 80 as there are cutouts 54. The liner 70 thus has at least one equipment support 80 facing each cutout 54. Specifically, each cutout 54 serves to give access to an equipment support.

An equipment support 80 may be carried by at least one leg 73, by at least the base 71, or by at least the top 75 of the liner 70.

By way of example, such a liner may be made by a three-dimensional printing method. In particular, since the liner does not necessarily have a structural function, it may be fabricated at least in part or indeed in full out of a material selected from the group of thermosetting materials.

FIG. 2 shows a first equipment support 300 carried by a leg, a second equipment support 400 carried by two legs, and a third equipment support 80, 500 carried by the top 75.

Each equipment support 80 is for carrying a piece of equipment 81 that is removable from said upper casing 40. A piece of equipment 81 may be in the form of a speed of rotation measurement sensor to measure a speed of rotation of the rotor mast, a sensor providing a signal determining the beginning or the end of a revolution performed by the rotor mast, a magnetic plug suitable for picking up metal filings from within a liquid, . . . .

Furthermore, the top 75 may be provided with a drip collector 76. The drip collector 76 is for locating close to and below spray means 23 of a rotor mast suitable for spraying a lubrication liquid towards the drip collector.

The drip collector 76 may have a section that is in the shape of a U or an L on its side, and that is open towards the housing collar 60 in order to collect the lubrication liquid. A U-section has a bottom 106 and two side branches, an L-section on its side has a bottom and one side branch. At least two legs 73, and possibly each leg, may be secured to the drip collector 76.

Furthermore, at least one leg 73 may include a duct 77 forming pipework integrated in the liner 70. Under such circumstances, such a leg 73 defines within such a duct 77.

Figure 5:
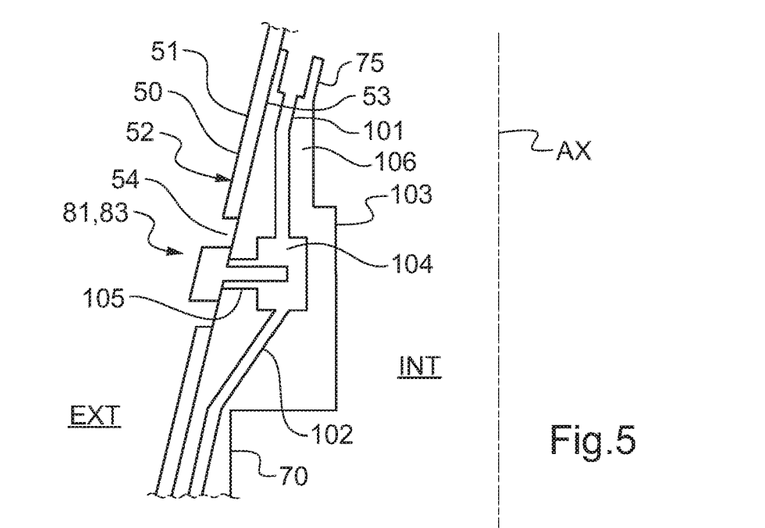
FIG. 5 is a diagram showing a magnetic plug carried by an equipment support.

With reference to FIG. 5, the liner 70 may include a device for detecting the presence of metal filings within the lubrication liquid collected by the drip collector 76. This device may comprise a top pipe 101 that extends from the bottom 106 of the drip collector 76 to an equipment support 80. The equipment support 80 presents a box 103 defining a cavity 104 opened on the top pipe 101. Furthermore, this equipment support 80 presents a channel 105 opening out into the cavity 104 and to the outside medium EXT via a cutout 54.

Under such circumstances, a removable magnetic plug 83 may be inserted in the equipment support so as to close the channel 105 and penetrate into the cavity. The lubrication liquid thus flows from the drip collector 76 to the cavity 104. The magnetic plug can thus detect the presence of filings in the lubrication liquid passing in the cavity.

In order to remove the lubrication liquid from the cavity 104, the liner 70 includes a bottom pipe 102 going from the cavity 104 towards, or indeed all the way to, the housing flange 55.

Figure 6:
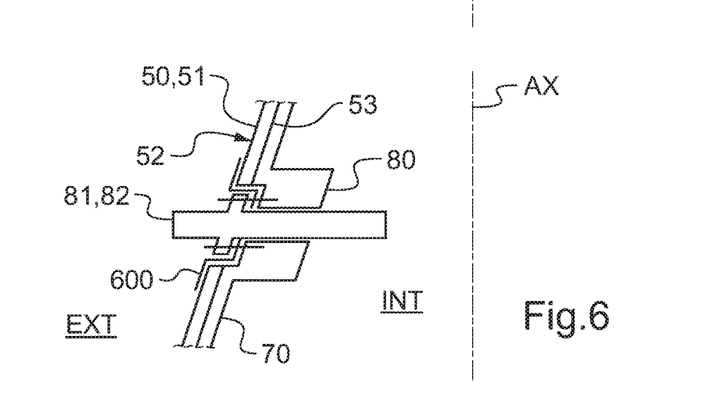
FIG. 6 is a diagram showing a sensor measuring a speed of rotation and arranged in an equipment support.

FIG. 6 shows an equipment support carrying a speed of rotation measurement sensor 82, for example.

The speed of rotation measurement sensor 82 may be fastened to the equipment support by conventional means, e.g. such as pins. Furthermore, metal reinforcing means 600 may be arranged between the shell and the equipment support, the metal reinforcing means being interposed between the speed of rotation measurement sensor 82 and the equipment support.

In another aspect, and with reference to FIG. 3, the upper casing 40 may include an insert 85 for fastening the housing collar 60 to a lift casing.

The insert 85 may be in the form of a ring, which should be understood broadly, since it is not necessarily circular.

The insert may be of the same shape as the housing collar 60. Thus, the insert 85 extends around a closed line in order to represent the perimeter of a bottom opening 56.

The insert 85 that is shown is arranged in elevation between the housing collar 60 and the top 75 of the liner 70. In particular, the insert 85 is pressed against the bottom bearing face 62 of the housing collar 60.

The insert 85 has tapped holes 86. Each tapped hole 86 is in alignment with a through orifice 64 in the housing collar 60. Thus, screw-fastener means, e.g. a bolt, can pass through a lift casing and through the housing collar 60 and the insert 85, thereby clamping the housing collar 60 between the lift casing 32 and the insert 85.

By way of example, the insert comprises a plate carrying tapped rings forming said tapped holes, the plate being pressed against the housing collar 60.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An upper casing for fastening to a lower casing and to a lift casing of a gearbox, wherein the upper casing comprises:
   a hollow shell made of composite materials, the shell presenting a side wall extending in elevation from an open housing flange towards an open housing collar, the side wall defining transversely a hollow inside space of the shell that extends along an extension axis and that opens out to an outside medium situated outside the shell via a bottom opening of the housing flange and via a top opening of the housing collar, the side wall including at least one cutout, the housing collar being for fastening to the lift casing, and the housing flange being for fastening to the lower casing; and
   an internal liner that is inserted inside the shell and that is fastened to the shell, the liner comprising a base in the form of a ring describing a closed line and a top in the form of a ring describing another closed line, at least two legs extending in elevation from the base to the top, the liner having at least one equipment support in register with the at least one cutout, the at least one equipment support being designed to carry a removable piece of equipment of the upper casing.

2. The upper casing according to claim 1, wherein the shell includes a multidirectional braid together with a plurality of unidirectional reinforcing plies, each reinforcing ply comprising preimpregnated fibers extending in elevation.

3. The upper casing according to claim 1, wherein the housing flange includes at least metal or composite reinforcement arranged between fiber plies, the reinforcement including passages in register with cells in the fiber plies, the passages and the cells being for passing screw-fastener means.

4. The upper casing according to claim 1, wherein the liner is made out of a material from the group of thermosetting materials.

5. The upper casing according to claim 1, wherein the housing collar extends in elevation from a plane bottom bearing face to a plane top bearing face that is for arranging against the lift casing, and the upper casing includes an insert of ring shape arranged in elevation between the housing collar and the top of the liner, the insert being placed against the bottom bearing face, the insert having tapped holes, each tapped hole being in alignment with a through orifice in the housing collar.

6. The upper casing according to claim 1, wherein the housing collar extends from the side wall towards the extension axis, the housing flange extending from the side wall away from the extension axis.

7. The upper casing according to claim 1, wherein the liner includes one of the at least one equipment support in register with one of the at least one cutout.

8. The upper casing according to claim 1, wherein the top includes a drip collector, the drip collector having a section that is open towards the housing collar, the at least two legs being secured to the drip collector.

9. The upper casing according to claim 8, wherein the liner includes at least one top pipe extending from a bottom of the drip collector to the at least one equipment support, this equipment support presenting a cavity opened on the top pipe, this equipment support presenting a channel opening out to the cavity and to the outside medium via one of the at least one cutout, a removable magnetic plug shutting the channel, the liner including a bottom pipe going from the cavity to the housing flange.

10. The upper casing according to claim 1, wherein at least one of the at least two legs includes a duct forming pipework integrated in the liner.

11. The upper casing according to claim 1, wherein the base includes a groove suitable for receiving a sealing gasket.

12. The upper casing according to claim 1, wherein the at least one equipment support is carried by at least one of the at least two legs.

13. The upper casing according to claim 1, wherein at least one equipment support is carried by at least the base or the top of the liner.

14. The upper casing according to claim 1, wherein the liner is adhesively bonded to the shell.

15. A gearbox comprising an outer housing, the outer housing comprising a lower casing fastened to the upper casing and a lift casing fastened to the upper casing, wherein the upper casing is the casing according to claim 1.

16. The gearbox according to claim 15, including a rotor mast and at least one speed of rotation measurement sensor measuring a speed of rotation of the rotor mast fastened to the at least one equipment support.

17. An aircraft provided with the gearbox, wherein the gearbox is in accordance with claim 15.

18. An upper casing for fastening to a lower casing and to a lift casing of a gearbox, wherein the upper casing comprises:
   a hollow shell presenting a side wall extending in elevation from an open housing flange towards an open housing collar, the side wall defining a hollow inside space of the shell extending along an extension axis and that opens out to an outside medium situated outside the shell via a bottom opening of the housing flange and via a top opening of the housing collar, the side wall including a cutout, the housing collar being fastenable to the lift casing, and the housing flange being fastenable to the lower casing; and
   an internal liner disposed inside the shell and that is fastened to the shell, the liner comprising a ring base describing a closed line and a ring top describing another closed line, at least two legs extending in elevation from the base to the top, the liner having an equipment support in register with the cutout, the equipment support configured to carry a removable piece of equipment of the upper casing.

19. The upper casing according to claim 18, wherein the shell includes a multidirectional braid together with a plurality of unidirectional reinforcing plies, each reinforcing ply comprising preimpregnated fibers extending in elevation.

20. A gearbox comprising an outer housing, the outer housing comprising a lower casing fastened to the upper casing and a lift casing fastened to the upper casing, wherein the upper casing is the casing according to claim 18.

* * * * *